US006950751B2

(12) United States Patent
Knobloch

(10) Patent No.: US 6,950,751 B2
(45) Date of Patent: Sep. 27, 2005

(54) METHOD AND APPARATUS FOR THE ASSIMILATION AND VISUALIZATION OF INFORMATION FROM 3D DATA VOLUMES

(75) Inventor: Charles S. Knobloch, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 3 days.

(21) Appl. No.: 10/404,208

(22) Filed: Mar. 31, 2003

(65) Prior Publication Data

US 2004/0204859 A1 Oct. 14, 2004

(51) Int. Cl.$^7$ ............................................... G01V 1/28
(52) U.S. Cl. ........................................................ 702/16
(58) Field of Search ......................... 702/6–18; 367/73

(56) References Cited

U.S. PATENT DOCUMENTS

| | | | | |
|---|---|---|---|---|
| 4,352,105 A | | 9/1982 | Harney | 343/5 CD |
| 4,467,461 A | | 8/1984 | Rice | 367/70 |
| 4,800,539 A | * | 1/1989 | Corn et al. | 367/72 |
| 4,970,699 A | * | 11/1990 | Bucker et al. | 367/70 |
| 5,563,949 A | | 10/1996 | Bahorich et al. | 364/421 |
| 5,589,732 A | | 12/1996 | Okibayashi et al. | |
| 5,724,309 A | * | 3/1998 | Higgs et al. | 367/48 |
| 5,930,730 A | | 7/1999 | Marfurt et al. | 702/16 |
| 5,966,672 A | * | 10/1999 | Knupp | 702/16 |
| 5,995,448 A | | 11/1999 | Krehbiel | 367/70 |
| 6,055,482 A | | 4/2000 | Sudhakar et al. | 702/16 |
| 6,226,596 B1 | * | 5/2001 | Gao | 702/16 |
| 6,278,949 B1 | * | 8/2001 | Alam | 702/16 |
| 6,571,177 B1 | | 5/2003 | Hardy | 702/16 |
| 2001/0032051 A1 | * | 10/2001 | Grismore et al. | 702/16 |
| 2004/0068375 A1 | * | 4/2004 | Cook et al. | 702/11 |

FOREIGN PATENT DOCUMENTS

WO    WO00/14574    3/2000

OTHER PUBLICATIONS

Alistair R. Brown; *Interpretive nomenclature—a plea for conformity*, Geophysics: The Leading Edge of Exploration, Oct. 1990, p. 47.

Tracy J. Stark; *Surface slice generation and interpretation: A review*, The Leading Edge, Jul. 1996, pp. 818–819.

Kurt J. Marfurt et al.; *Coherency calculations in the presence of structural dip*, Geophysics, vol. 64, No. 1 (Jan.–Feb. 1999), pp. 104–111, 10 Figs.

Charles Knoblach; *Pitfalls and Merits of Interpreting Color Displays of Geophysical Data*, SEG 1982, p. 112.

Richard Ottolini et al., *On–line movies of reflecting seismic data with description of a movie machine*, Geophysics, vol. 49, No. 2 (Feb. 1984), pp. 195–200, 4 Figs.

* cited by examiner

Primary Examiner—Donald McElheny, Jr.
(74) Attorney, Agent, or Firm—Madan, Mossman & Sriram, P.C.

(57) ABSTRACT

The present invention provides a method and apparatus for displaying selected characteristics of geological features. Color-features, for example, hue, saturation and intensity, or other use selected color-features, are assigned to represent different attribute values of geological feature characteristics. The method provides for displaying multiple characteristics of multidimensional geological or other displays in one presentation. Various characteristics that may be displayed concurrently include geological feature position, shape, coordinates, thickness values, petrophysical values, amplitude values, and velocity values. The invention provides a device adapted for use by a workstation wherein geological data is read into memory and processed into a color display of a subterranean feature, or used in a computer programmed to produce images representative of a subsurface geological features.

29 Claims, 5 Drawing Sheets

(2 of 5 Drawing Sheet(s) Filed in Color)

METHOD AND APPARATUS FOR THE ASSIMILATION AND VISUALIZATION OF INFORMATION FROM 3D DATA VOLUMES

FIELD OF THE INVENTION

This invention relates to the field of "data modeling and presentation" and, more particularly, to the use of color displays in geoscience data representation and displaying attributes of a 3-D volume of data for identifying structural and stratigraphic features in three dimensions.

BACKGROUND OF THE INVENTION

In the oil and gas industry, geophysical and geological prospecting techniques are commonly used to aid in the search for and evaluation of subterranean hydrocarbon deposits. Geophysical data are combined with geological data and interpreted for purposes of analysis and for presentation to decision makers. The interpretations, and the information they contain, form the basis for decisions whether and where to drill for hydrocarbons. The interpretations are comprised of representations of subterranean geological features or objects like bedding layers, fault traps, anticlines, and other features well known to practitioners in the art. For example, an interpreted bedding layer surface may be displayed as a three-dimensional object showing the layer's position in the subsurface. However, these geological objects are not merely surfaces in a subterranean space, they are also associated with a whole host of characteristics critical to decision making that are not presented in one presentation.

Display and presentation methods have been developed by related geoscience disciplines, particularly in the oil industry, because of the need to combine and present large amounts of related complex data efficiently. This background section describes the basics of seismic data acquisition and some aspects of data presentation. As will be apparent from the description of the display methods, most data displays relate primarily to a presentation of one characteristic of data, or one data characteristic associated with a subsurface position.

Generally, a seismic energy source is used to generate a seismic signal, which propagates into the earth and is at least partially reflected by subsurface seismic reflectors (i.e., interfaces between underground formations having different acoustic impedances). The reflections are recorded by seismic detectors located at or near the surface of the earth, in a body of water, or at known depths in boreholes, and the resulting seismic data may be processed to yield information relating to the location of the subsurface reflectors and the physical properties of the subsurface formations.

2-D seismic data is acquired along lines that consist of geophone arrays onshore or hydrophone streamer traverses offshore. FIG. 1, shows an example of portions of a marine seismic data acquisition system. A vessel 10 on a body of water 15 overlying the earth 16 has deployed behind it a seismic source array 20 and a streamer cable 25. The seismic source array 20 is typically made up of individual air guns (not shown) that are fired under the control a controller (not shown) aboard the vessel 10. Seismic pulses propagate into the earth and are reflected by a reflector 22 therein. Exemplary raypaths 41a, 41b from the source to the receiver are shown. For simplifying the illustration, only one reflector is shown: in reality, there would be numerous reflectors, each giving rise to a reflected pulse. After reflection, these pulses travel back to the surface where they are recorded by detectors (hydrophones) 30a, 30b, . . . , 30n in the streamer cable. The depth of the source array and the streamer cable are controlled by auxiliary devices (not shown). In acquiring a line of seismic data, the vessel 10 travels in the water and periodically fires the airgun 20 at different source locations. Data corresponding to each such source location are recorded by the plurality of receivers.

The acquisition geometry for a full 3-D data set on land is illustrated in FIG. 2 wherein, within a region 119, sources 124 are deployed along a plurality of source lines 126a, 126b. . . 126n and data are recorded by receivers 122 along receiver lines 120a, 120b. . . 120n nominally defining an inline direction. In conventional processing, data from the plurality of sources and receivers are output into bins such as 121. With this high density coverage, extremely large volumes of digital data need to be recorded, stored and processed before final interpretation can be made. Processing requires extensive computer resources and complex software to enhance the signal received from the subsurface and to mute accompanying noise which masks the signal.

3-D marine seismic data may be acquired (not shown) by using a plurality of widely spaced parallel streamers recording energy that has been generated by a number of seismic sources that are spaced apart in the cross-line direction. Once the data is processed, geophysical staff compile and interpret the 3-D seismic information in the form of a 3-D cube which effectively represents a display of subsurface features. Using the data cube, information can be displayed in various forms. A commonly used display comprises horizontal time or depth slice maps can at selected locations within a data volume. Using a computer workstation an interpreter can slice through the field to investigate reservoir issues at different horizons. Vertical slices or sections can also be made in any direction using seismic or well data. Time maps can be converted to depth to provide a structural interpretation at a specific level.

Seismic data has been traditionally acquired and processed for the purpose of imaging seismic reflections. Changes in stratigraphy and structure are often difficult to detect on traditional seismic displays due to the limited amount of information that seismic data contain in a cross-section view. Although 3-D views provide an opportunity to see a much larger portion of these features, it is difficult to identify fault surfaces within a 3-D volume where no fault reflections have been recorded.

U.S. Pat. No. 5,563,949 to Bahorich et al teaches dividing the three-dimensional volume into a plurality of vertically stacked and generally spaced apart horizontal slices; dividing each of the slices into a plurality of cells; measuring across each of the cells the cross-correlation between one pair of traces lying in one vertical plane to obtain an in-line value and measuring the cross-correlation between another pair of traces lying in another vertical plane to obtain a cross-line value that are estimates of the time dip in an in-line direction and in a cross-line direction; combining the in-line value and the cross-line value to obtain one coherency value for each of the cells; and displaying the coherency values of the cells across. Such a coherency display is particularly well suited for interpreting fault planes within a 3-D seismic volume and for detecting subtle stratigraphic features in 3-D. This is because seismic traces cut by a fault line generally have a different seismic character than traces on either side of the fault. Measuring trace similarity, (i.e., coherence or 3-D continuity) along a time slice reveals lineaments of low coherence along these fault lines. Such coherency values can reveal critical subsurface details that are not readily apparent on traditional seismic sections. Also by calculating coherence along a series of time slices, these fault lineaments identify fault planes or surfaces.

U.S. Pat. No. 5,892,732 to Gersztenkorn discloses a modification of the Bahorich invention wherein a covariance matrix is determined for each of the cells and a seismic attribute determined from the eigenvalues of the covariance matrix is displayed. Gersztenkorn teaches that the ratio of the dominant eigenvalue of the covariance matrix to the sum of the eigenvalues is an indication of the coherence of the data. The presentation of these data is of a similarity measure on a time slice.

U.S. Pat. No. 6,055,482 to Sudhakar et al. teaches display of other types of seismic attributes in a 3-D data volume. For example, azimuth ordered seismic gathers are used to identify subterranean features such as fault and fracture patterns. Offset ordered coherence analysis is used to form an optimum stack at the subterranean location of interest.

A number of prior patents teach the use of color for displaying of seismic data to bring out features that are normally lost in a conventional seismic display. The teachings of U.S. Pat. No. 4,467,461 to Rice allow the interpreter to more easily comprehend simultaneous variation of several geophysical data attributes and to relate the effects to a specific end result for the geophysical indicators of interest. One or more geophysical attribute variables are quantified and then rasterized so that the data is represented as a gridded variable area display wherein color intensity of the grid units is some function of the instantaneous variable. The resulting data are then loaded into digital refresh memory of an image processing computer whereupon data are mixed for analysis in accordance with operator selected colors and color intensity weighting.

In U.S. Pat. No. 5,995,448 to Krehbiel, a suite of features extracted from a sequence of windows form a multivariate attribute of the raw data. These features include the energy, slope in the middle of a window, the autocorrelation, average trace amplitude, standard deviation of the amplitude, first and second lags of the autocorrelation. Combinations of three of these features are color coded and superimposed on a display of the seismic section.

U.S. Pat. No. 5,930,730 to Marfurt et al and Marfurt, K. J., Sudhaker, V., Gersztenkorn, A., Crawford, K. D. and Nissen, S. E., 1999, Coherency calculations in the presence of structural dip: Geophysics, Soc. of Expl. Geophys., 64, 104–111, teaches the use of color displays for a 3-D volume of seismic data. A color map, characterized by hue, saturation and lightness, is used to depict semblance/similarity, true dip azimuth and true dip of each cell; true dip azimuth is mapped onto the hue scale, true dip is mapped onto the saturation scale, and the largest measurement of semblance/similarity is mapped onto the lightness scale of the color map.

PCT Patent Publication WO 0014574 to Giertsen et al discloses a method of producing one or more volume windows within a 3-D data volume that can be interactively moved around in the entire data volume and viewed from different positions at different angles. By color and opacity manipulations inside the volume windows, the data therein are made transparent, allowing for visualization of selected target portions of the data set.

As pointed out in Giertsen, it is difficult to get a good understanding of complicated 3-D data set on a flat screen or a piece of paper. It is also laborious and difficult to interact with 3-D objects using a keyboard and a mouse. Analysis of 3-D data sets are commonly done using 2-D slices through the data cube. Furthermore, the screen size limits the amount of information that can be presented. Yet another drawback of prior methods of displaying 3-D data is that the interactive output of a graphical workstation is necessarily viewable only by a limited number of viewers.

The use of color displays in data presentation has increased with the advent of cost effective color display devices. Color displays have opened the door to the presentation of data in ways that have not been realized on standard displays. To people who can perceive colors, the added dimensions of color allow more detail to be placed on a display than can be placed on an equivalent gray scale. Color-additive and color-subtractive properties have been used by industry in an attempt to "see" features in multiattribute data sets. The number of possible schemes using these and other properties of color create presentation forms not possible using just shades of gray.

The potential increase in data density and the new presentation schemes present new problems to the interpreter. First, explorationists must learn the properties and merits of each new presentation scheme, the properties and merits must be discovered. Second, artifacts of the color display must be identified and removed from the interpretation. Features created by subtleties of variable-area wiggle-trace (VA+WT) displays can be recognized by explorationists. Color displays create more and varied artifacts. Finally, in order to recognize the merits and pitfalls of color displays, the explorationist should have a basic working knowledge of color theory. This knowledge need not be more than that found in an art class or encyclopedia, but should be sufficient to aid in differentiating between color artifacts and actual anomalies in the data.

Colors, when coming directly from light sources, blend to form different and brighter colors. All colors, when mixed together, produce a white light. This type of mixing, the same as produced by a color picture tube, is called color-addition. Colored reflectors, such as paints, do not behave this way when blended. Pigments, when mixed, produce darker colors; this is the color-subtractive property of color. Color can be broken into three components: hue, saturation, and lightness. The Munsell color system names the components "hue", "chroma", and "value". The former terms to describe color-additive displays, the latter terms apply to color-subtractive based displays. The Munsell color system appears to be an ellipsoid with each axis representing one of the three components of color.

The three components of color can be used to produce several million different colors that the eye can differentiate. Hue contributes the basic coloring agent, such as red, green, or blue. Lightness or value is a measure of the brightness of the color. A gray-scale varies in lightness, from black (dark) to white (bright). Saturation or chroma is a measure of the proportion of hue to grayness. A gray-green would not be very saturated with color, yet a pure green would be saturated in color. No saturation would return us to the gray-scale.

A color variable density display of a seismic section has a different appearance than its black and white VA+WT counterpart. On a VA+WT display the apparent continuity of an event is generated by both the event's actual continuity and the amplitude of the event. The apparent continuity on a variable density display is composed of the actual continuity and the horizontal resolution. Low amplitude, but coherent, events are easier to spot on a variable density display than on a VA+WT display. The dynamic range of a black-and-white VA+WT display appears to be no more than 24 dB, a ratio of 16 to 1 between the largest amplitude value and the smallest discernible amplitude value. Most black-and-white variable density displays also have this range limitation. Through the use of color, it appears the effective dynamic range is around 30 to 36 dB, at least a doubling of the amplitude ratio. This not only allows representation of a wider range of amplitudes on a section, but also allows events that the processor has suppressed in amplitude to "reappear" on the section. For "relative-amplitude" displays this may be advantageous, but weak multiples and diffractions will reappear on the section. The standard VA+WT black-and-white section has a cut-off region for high amplitudes. When an event is of a high enough amplitude, it will start to overlap the adjacent trace. Thus, over a particular threshold it does not really matter what amplitude the trace is. This saturation effect is duplicated in a color display if amplitudes over a particular value are assigned a maximum color. Color also can display positive and negative amplitude values in a similar fashion, using two different hues.

The way in which the data is scaled to the various colors of the color bar can affect the appearance and interpretability of the display. Some schemes set the scaling by using the minimum and maximum data value, or some percentage of that value. Other schemes use a percentage of the data to set the minimum and maximum value, then linearly scale the color bar between these values. Still others control the percentage of data going to each color of the color bar. Each of these methods has advantages and drawbacks, but the advantages can not be realized unless a careful study of the color bar is made. If some portions of the color bar contain almost indistinguishable color variations, then assignment of an equal amount of data to each color will have little benefit. The scaling criteria for color displays is more critical than for black and white VA+WT displays and also creates more possibilities and problems.

The choice of colors in the color bar can affect the appearance of the display. For example, a color bar could be various shades of gray-green with a bright red color in the middle. The display resulting from the color bar will be composed of red bands, a red band occurring wherever the amplitude of the data passed through the red color range. The rest of the section will be fairly nondescript. This contouring of a particular amplitude range may have no geophysical meaning, but may be mapped and interpreted. Some color bars have this effect without assigning the drastic color changes to data value ranges of interest or significance. Others use this feature to accentuate the areas of interest. The colors in the color bar, and how they are applied, should be checked when looking at a color display.

Current commercially available 3D data presentation techniques for the petroleum exploration industry do not allow simultaneous display of information related to multiple geologic bedding planes (or features) without sacrificing display of information related to the relative or absolute sequencing of the planes (or features) to each other. Thus, only a limited amount of information can be presented to the interpreter or engineer in a single unified format, preventing the interpreter or engineer from making necessary associations, interpretations, or inferences to the multiple physical or geologic information available.

Heretofore, as is well known in the seismic processing and seismic interpretation arts and related geoscience disciplines, there has been a need for a method and apparatus for presenting and displaying (assimilation and visualization) more information characteristics simultaneously, about an object of interest, than current display methods provide for. Additionally, this method and apparatus should provide for improved attribute analyses and interpretation of data in one presentation. Accordingly, it should now be recognized, as was recognized by the present inventor, that there exists a need for a method and apparatus of data presentation, assimilation and visualization to address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

The present invention provides a method and apparatus for displaying selected characteristics of geological features. Color-features, for example, hue, saturation and intensity, or other selected color-features, are assigned to represent varying attribute values of geological feature characteristics. The method provides for displaying multiple characteristics of multidimensional geological or other displays in one presentation. Various characteristics of geological features that may be displayed concurrently include geological feature position, shape, coordinates, thickness values, petrophysical values, amplitude values, and velocity values. Varying attribute values of one or more geological feature characteristics can be viewed in one display. The invention provides a device adapted for use by a workstation wherein geological data is read into memory and processed into a color display of a subterranean feature, or used in a computer programmed to produce images representative of a subsurface geological features with associated characteristics concurrently displayed.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The present invention and its advantages will be better understood by referring to the following detailed description and the attached drawings in which.

Figure 1:
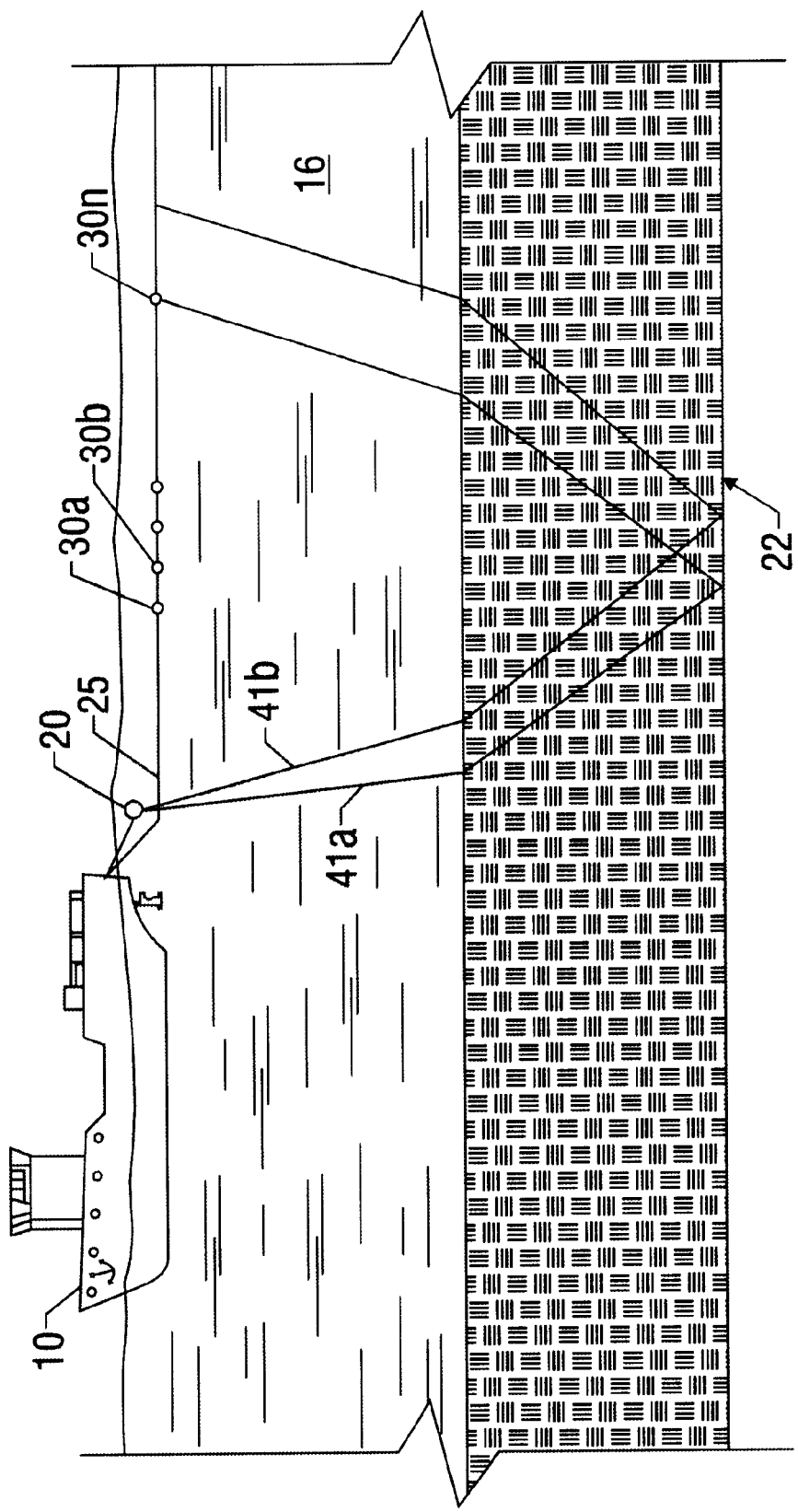
FIG. 1 (PRIOR ART) shows an example of marine seismic data acquisition.
Figure 2:
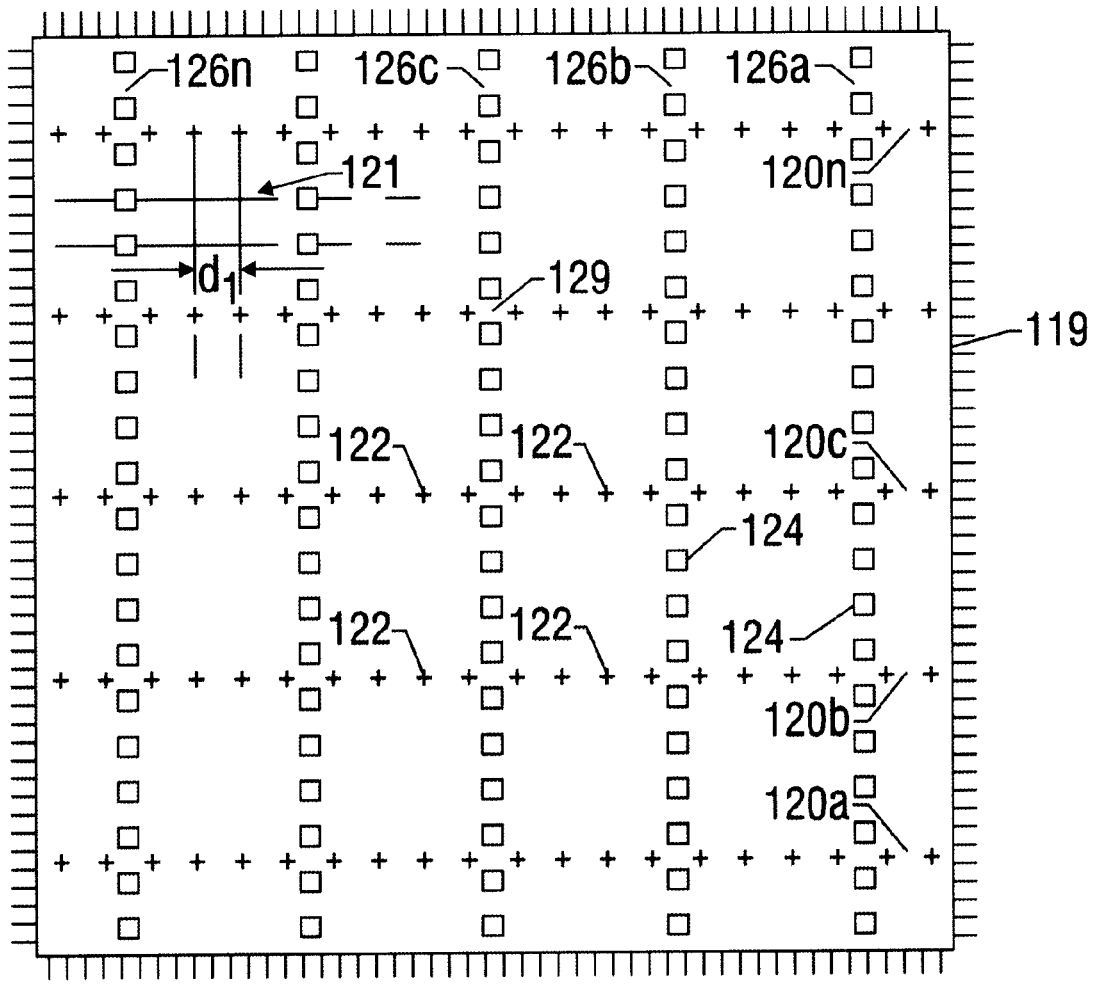
FIG. 2 (PRIOR ART) shows the geometiy of a land 3-D seismic acquisition system.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The present invention is a method and apparatus for the presentation, assimilation and visualization of characteristics of objects in and associated with large quantities of information from multidimensional data volumes, for example 3D geoscience data sets. The method and apparatus provides for displays of data objects and features and characteristics of data objects wherein these displays contain enhanced information. For example, a multidimensional display is able to simultaneously communicate an object's position, depth, thickness and density in one image. Additionally, other objects or features with the same or other characteristics can be displayed in the same image. Varying attribute values of one or more geological feature characteristics can be viewed in one display. Incorporating several attributes of objects in a display into a single image is more convenient relative to creating individual displays of separate characteristics. Other advantages of the invention will be readily apparent to persons skilled in the art based on the following detailed description. To the extent that the following detailed description is specific to a particular embodiment or a particular use of the invention, this is intended to be illustrative and is not to be construed as limiting the scope of the invention.

Objects in data sets, for example interpreted horizons or geological layers of bedding have associated coordinate positions as well as a host of other related information, both known and unknown. For example a geological bedding layer also has associated characteristic attributes like thickness, porosity, density, lithology, distance to other points, surfaces or objects, etc.

These subterranean geological objects may be graphically displayed using an apparatus for displaying selected characteristics of these subterranean objects. An apparatus for a data display can comprise an appropriate operating system on a capable computer attached to a display device like a monitor or printer. Example of operating environments include Windows XP, NT/95, UNIX, Solaris, Linux, and IBM AIX. An example of a computer and display system is the Solaris Operating Environment (an operating system) and the Sun Blade 1000 or UltraSPARC computer workstations with various software that produces images on a display monitor. Other well known computers and computer workstations capable of equivalent displays are marketed by IBM and SGI, among many others. Display apparatus can contain computer-readable medium having computer-executable instructions wherein the computer memory includes floppy disks, hard drives, DVD, CD-ROMS, Flash ROMS, nonvolatile ROM, RAM and many others known in the art.

The invention provides a method and apparatus to allow character attributes associated with an object like a bedding plane or geologic feature to be identified by changes along one or more color axes while relationships with other bedding planes, fault planes or other features are identified by changes along another color axis. Other character attributes within the bedding planes or features can be identified by changes along a third color axis. The color axes, for example, can be the color-features "hue," "saturation," and "intensity." Hue is color or the gradation of color; it is the attribute of colors that permits them to be classed as red, yellow, green, blue, or an intermediate between any contiguous pair of these colors. Saturation refers to chromatic purity, that is, freedom from dilution with white. Saturation may also be considered as the degree of difference from the gray having the same lightness or the degree of difference from the achromatic light-source color of the same brightness. The attribute of a display by which color is ordered continuously from light to dark is in correlation with its intensity.

A major element of the present invention is the ability for the interpreter assimilate large amounts of technical data for each object, bedding plane or feature, and at the same time, also capture the associations for several other different objects, bedding planes or features. This invention provides for a single visual presentation to see the positioning of bedding planes or features in multidimensional volumes as well as a plurality of associated attributes and shapes. With the advent of multidimensional data volumes, like 3D and 4D volumes, it is now essential to use an invention such as this to more fully visualize and understand the geological model represented by the physical or geological data.

Figure 3:
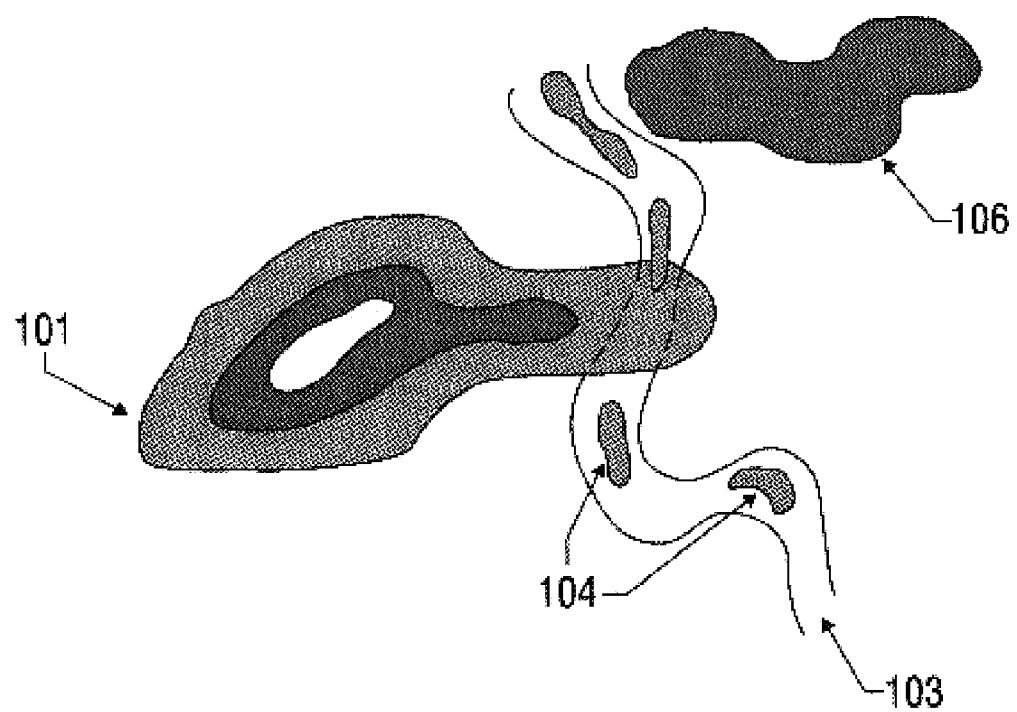
FIG. 3 illustrates a plan view of Geologic Features without the application of the present invention.

Geologic beds or other features possesses a plurality of attributes or data characteristics. For example, one attribute is the coordinates of the surface representing the top of the feature, e.g., time or depth. Time or depth is the attribute of bedding layers usually presented in displays of geological or geophysical data. FIG. 3 is a plan view of geologic features presented with black outlines but without the application of the present invention. Those versed in the art will easily recognize the objects presented in FIG. 3 as the geological features of a closed high (an anticline 101), a paleo-channel 103, and a separate sand body 106. However, in practice the black outlines will not be visible making interpretation difficult. In fact, the interpreter's task is the art of applying these black lines. If the data in FIG. 3 were not already composed of interpreted data objects, as they are here, interpreting the geological or geophysical data would be difficult. For example, without the black outlines, FIG. 3 would show only a contoured surface of a geologic bedding layer 101, the surface attribute displayed as a series of contours, an isometric, or perspective drawing. The paleo-channel 103 containing sand bodies 104 may be situated below, and spatially coincident in horizontal (not vertical) space to part of geological feature 101. However, this channel would be nearly or actually invisible without the black outlines. The discrete sand bodies 104 would be difficult or impossible to see using conventional displays of data. Geological feature 106, a separate sand body, is adjacent to channel 103 and may not be well differentiated in a two-dimensional map display. In fact, even with the black outlines presented in the figure, feature 101 and feature 106 could easily be mistaken to be part of the same feature.

Figure 4:
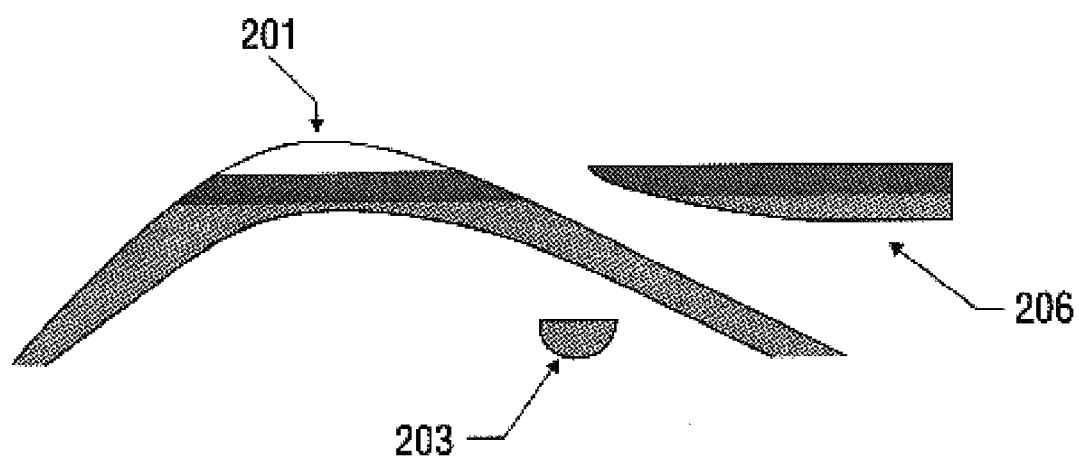
FIG. 4 illustrate a cross section view of Geologic Features.

Another display of the same geological features seen in FIG. 3 are displayed in vertical cross section view in FIG. 4, a display of data without application of the present invention. The anticlinal structure 101 from FIG. 3 is displayed as bedding layer anticline 201. The FIG. 3 channel 103 may be seen beneath the anticlinal folds 201 as channel 203. The sand body 106 of FIG. 3 is seen as a wedge feature 206 that is at a level that is below the crest of anticline 201. As is known to those practiced in the art, feature 206 is difficult to properly interpret on conventional data, whether in plan view or vertical cross section. Colors have been applied along the vertical axis of FIG. 4 corresponding to the depth from surface. As can be seen, the uppermost crest of bedding layer anticline 201 corresponds to a yellow color hue. The uppermost top of sand body 206 corresponds to a green color hue. The uppermost top of channel 203 corresponds to a brown hue. These color hues are presented here as a matter of example only and do not necessarily represent required hue assignments in general application of the present invention.

The method and apparatus of the present invention provide for increased ability to make interpretations directly on data or on interpreted objects in a data set, and greatly increased ability to communicate those interpretations to others, such as when presented to investors or management.

Figure 5:
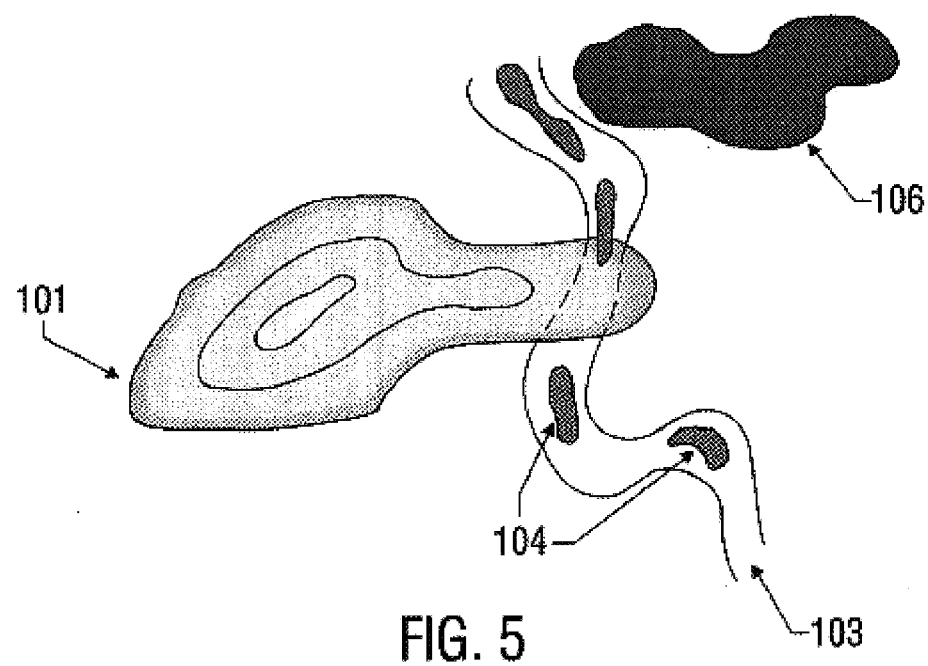
FIG. 5 illustrates a plan view of the Geologic Features of the FIG. 1 with the method of the present invention applied.

FIG. 5 is a map or plan view of the Geologic Features of FIG. 3 with the method of the present invention applied. Object 101, the anticlinal structure, is displayed with characteristics or attributes that make it easier to clearly distinguish from sand body 106. The yellow color hue of anticlinal structure 101 of FIG. 5 is determined by the depth to the uppermost crest of the anticlinal structure. The green color hue of sand body 106 of FIG. 5 is determined by the depth to the uppermost top of the sand body. A second attribute is shown by changing the intensity of the color, which is varied based on the relative depth from the uppermost crest of anticline 101. In this case, changing the intensity of the yellow hue for anticline 101 illustrates the relative depth from the crest.

Thus, the color hue serves to communicate the depth position of anticline 101 relative to other features, such as sand body 106, while the color intensity of the color hue serves to communicate the relative depths within anticline 101. Sand body 106 is shown with a nearly constant color intensity, which represents that the top surface is essentially flat as would be expected by examining the cross section in FIG. 4 of equivalent cross-section view of feature 206. The channel 103 contains sand lenses 104, which further illustrate these sand lenses 104 all have approximately the same color hue, assisting in the identification of channel 103 from other features, such as anticline 101 and sand body 106.

Figure 6:
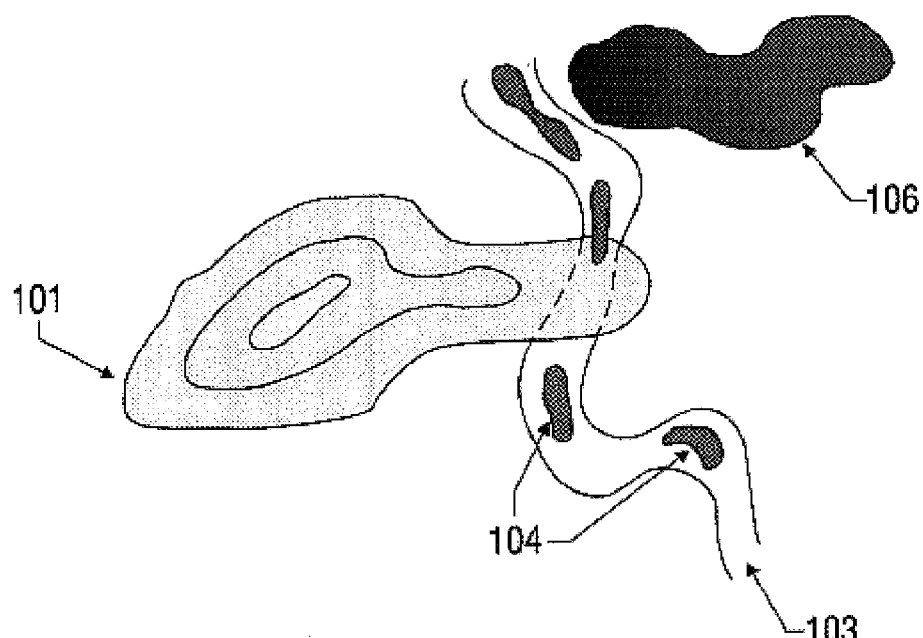
FIG. 6 illustrate a plan view of the Geologic Features of FIG. 1 with a bedding layer thickness attribute emphasized using the method of the present invention.

As illustrated in FIG. 6, an additional attribute may be displayed, such as the vertical thickness of the geological feature. Again, the color hue of all features in this example are determined by their depth to their uppermost crest or top. Now, because the strongest intensity colors are in the center, it can be seen that the thickest portion of anticline 101 is also the highest point on the structure. The sand body 106 is now shown with a variable color intensity in FIG. 6, which represents that, while the surface is essentially flat as would be expected by examining the cross section in FIG. 4 of equivalent feature 206, the thickness decreases towards its leftmost portion. The channel 103 contains sand lenses 104 as represented by the solid color of these lenses 104. Any subtle variations in the thickness of sand lenses 104 will appear as changes in color intensity.

So, in addition to presenting the surface coordinate attribute of a geologic feature as is common in displays of 3D data volumes, other attribute values for display can include the vertical thickness of the feature, acoustic response, sand/shale ratio, net sand thickness, height above a contact, etc. Another attribute is the relative position characteristic, usually vertical distance of one geologic bed or feature to another geologic bed or feature. Another relative position characteristic can be the distance from one position on a feature (like the highest point) to other points on the same feature or other features. For example, the distance from the crest of an anticline to other points on the anticline may be represented as a change in color saturation or graying of the color as relative (vertical, horizontal or linear) distance from the crest increases. It is one of the objectives of the present method and apparatus to provide for a presentation so that an interpreter or investor can quickly and easily assimilate a plurality of attributes associated with an object in a multidimensional display, thereby more effectively and efficiently communicating the interpreters' work to others.

Layers of bedding or other geological features with their associated attribute values may be viewed together in one display presentation with the present invention. In one embodiment, these layers of bedding or features are displayed by forming a display for each of the bedding layers of interest and one or more associated attributes. First, a coordinate value is assigned along a first axis (for example, the z-axis) of a three-dimensional coordinate system for a object or feature to display. A first color-feature (hue, saturation, or intensity) is assigned for a bedding layer or object, this color feature is based on the coordinate value assigned along this first axis. For example, the hue assigned to the geological feature is based on the coordinate value of highest point of the geological feature. Alternatively, the hue assigned to the geological feature could be based on the coordinate value where the coordinate system origin intersects the geological feature along the vertical axis. A set of attribute values associated with this first characteristic of each bedding layer or object is assigned to be displayed using the color-feature. For example, bedding layer attributes include bed thickness, porosity, density, acoustic response, sand/shale ratio, sand thickness, height above contact, relative position to other features, bed shape, seismic travel-time, etc. A second color-feature (hue, saturation, or intensity) is assigned to represent attribute values for one or more other characteristics to display concurrently with the first characteristic. In summary: An object (like a geological feature) is assigned to coordinates on a 3D axis; a color-feature (hue, saturation, or intensity) is assigned to the object so that, in the usual case for the surface of a displayed object, a first, second and optionally a third characteristic can be assigned to coordinates for the object. Color-features are assigned to the objects' characteristic attributes chosen for display so that multiple characteristic of display object may be viewed together.

As an example, when the object to display is an arbitrary geological bedding layer, hue can be used for the vertical (time or depth) representation while the shape of the bed may be represented by intensity or saturation. As a refinement of this embodiment, it is possible to interchange attributes and color-features. For example, color intensity can be used to represent depth or time, and color hue used to represent relative shape. Color hue could be used for shape or another attribute. Bedding thickness rather than shape may be represented. Other objects in a display such as other layers of bedding or geologic features may be treated similarly, and yet displayed concurrently in one presentation without confusion.

In a preferred embodiment the "z" axis of the 3D coordinate system can be assigned to a first axis, related to distance below the surface of the earth, and representing time or depth. An attribute on or within this bedding surface can be represented by using the difference between a coordinate point value nearest to the earth's surface along the "z" axis of a layer of bedding and coordinates being displayed. In other words, the vertical distance from a selected point of a bedding layer to the highest point on the subsurface layer may comprise the attribute values of the characteristic for display. As an example, the first color-feature for representing time or depth on this surface can be the color hue, and the color saturation and color intensity can be held constant. At the same time, attribute values representing the vertical distance from the top of the structure for the entire layer of bedding can be shown using the color intensity.

In this way, the color hue may be used to represent the relative depth (or time) of the geologic feature and the color intensity to represent the relative shape of the surface of each geologic feature. In practice, a display using this technique will reveal a geologic trap as a brightly colored "drape" that fades to darkness as the trap plunges to depth. Nearby geologic features will also create a "drape", according to the shape of their surface, fading to darkness as they plunge to depth, but displayed with a color of different hue to distinguish them from the other geologic features (because their respective depth to uppermost top is different). Therefore, two separate features, such as two different bedding planes, will be distinguishable from each other while at the same time identifying their relative surface shape all in one visual display.

This embodiment may be further extended by adding another set of attribute values that are assigned to a another characteristic of each layer of bedding, and a third color-feature assigned for this attribute value. Any of the several characteristics listed above may be chosen for the subsequent sets of attribute values. One may also choose specific color wheels or combinations of color wheels, or assign specific combinations of attributes to specific colors, without regard to hue, saturation and intensity. In other words, the color-features hue, saturation and intensity may be augmented or replaced with other user derived color-features.

In still another embodiment, the first characteristic for display can be related to the "z" axis coordinate attribute value, a distance below the data volume surface in time or depth for a geological object to display. The first color-feature to represent the distance below the surface can be the hue. The characteristic represented by hue is the top of the surface of the layer of bedding. The next set of attribute values can be the relative depths (or times) of the layer of bedding from highest point on the geological object being displayed. The second color-feature is intensity; the second set of attribute values represented using intensity can be the vertical thickness of the geological object being displayed. So, a geological object may be displayed using hue to represent the surface position and intensity to represent the thickness. Still other characteristics of the geological object like porosity (or net sand thickness, or height above a contact) may be represented with another color feature like intensity, and so three or more characteristics of a geological object may be displayed together.

In this embodiment the object thickness (or vertical feature thickness) may alternatively be displayed by varying the color saturation, rather than intensity. In practice, a display of a geological bedding layer using this technique will reveal a geologic trap as a brightly colored "drape" that fades to darkness as the trap plunges to depth. Where the trap is thick, the overall color hue will be pure (that is, without grayness). Where the bedding is thinner, the color will tend toward grayness. Where the bedding is thick and high the overall color will be bright and pure, tending toward the pure hue. Where the bedding is thin and high the overall color will be bright but gray, tending toward white. Where the bedding is thin and low the overall color will be dim and gray, tending toward black. Where the bedding is thick and low, the overall color will be dim but pure, tending toward black but with the pure hue.

Other useful variations include the use of relative distance between display objects rather than absolute distance from a data volume side or outside surface. For example in a 3D geological display, seismic travel-time between surfaces may be used rather than depth. Intensity may be used to identify and display bed thickness, for example, black is no thickness, white or a pure hue is a maximum thickness. Intensity may be used to identify depth or time. Saturation may be used to identify bed thickness. Seismic offsets may be used as a characteristic.

In a preferred embodiment, a color bar is mapped to a vertical axis and a color feature (like hue) for a geological feature is chosen based on the coordinate value mapped from the color bar. Equivalently, a color table (or color wheel) may used instead of a hue-saturation-intensity color-feature system. As an example, a first geological layer may have a red hue mapped from a color bar from the highest point of the layer along a vertical axis. Then the layer could be displayed in red, with saturation used for layer thickness and intensity used for relative distance from a specified position. Additionally, a second geological layer may have a green hue with saturation used for relative distance from a specified position. In this way, multiple characteristics of two layers (or more) can be illustrated in one display. Additionally, relative parameter variations between two (or more) geologic or layers may be communicated in one display.

The choice of a first axis is not limited to the z-axis, it can be the x-axis, y-axis, parametric line or surface, etc. The method is not limited to Cartesian Coordinate systems. As mentioned above, the coordinate value may be depth or time, and may be assigned a display characteristic that is a relative distance value to another location or surface. The choice of color-feature to assign to an attribute is not critical, though some may have certain display advantages over others in certain situations.

Figure 7:
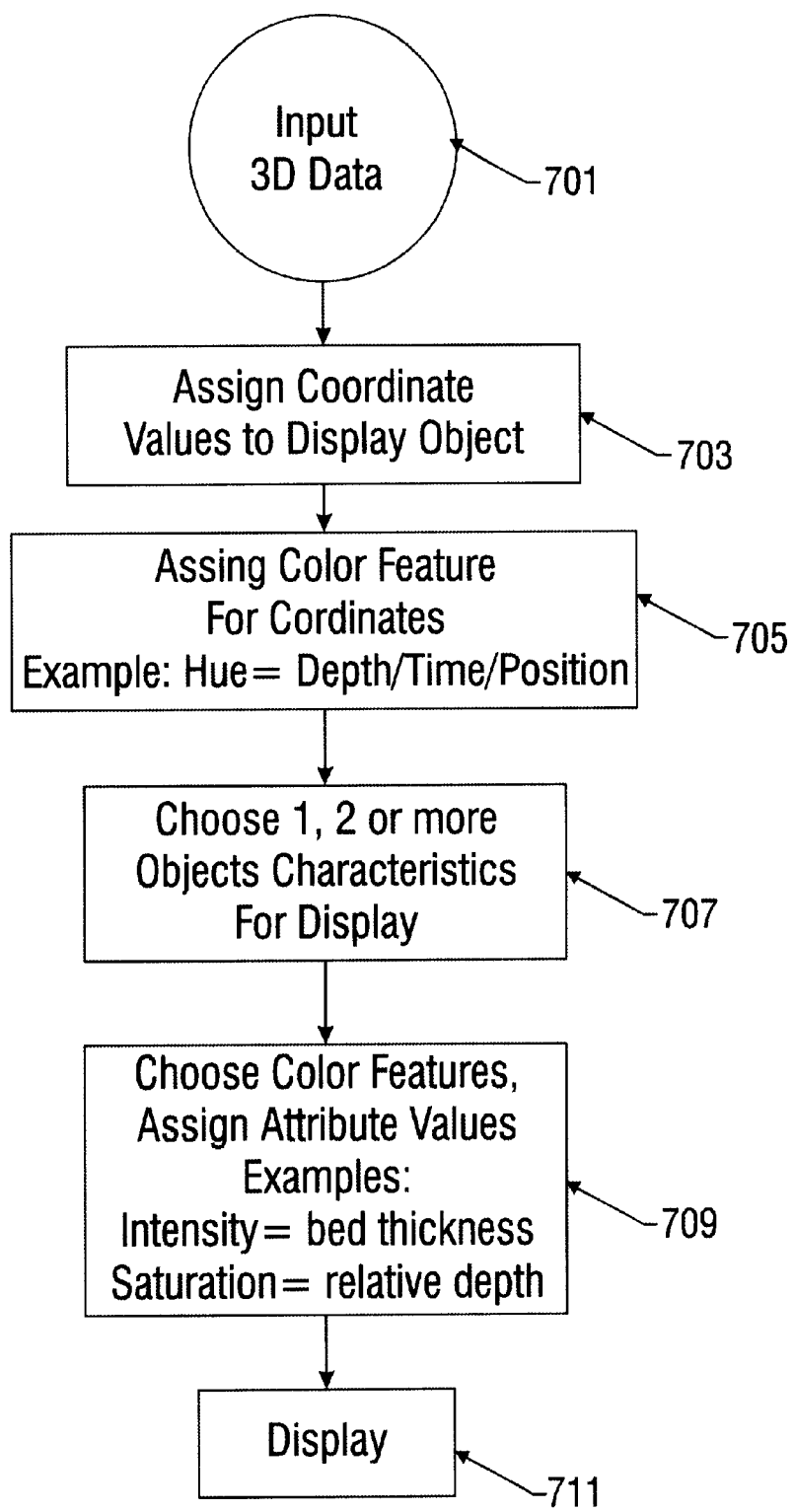
FIG. 7 is flow chart of a data flow for the present invention.

FIG. 7 is a flow chart of a data flow for the present invention. Data 701 from a multidimensional data set, for example containing geological objects like bedding surfaces or volumes, are input to the method and apparatus of the present invention. A coordinate value is assigned along a first axis of a 3D coordinate system 703 for each object to display. A color-feature is chosen from hue, saturation and intensity for the value of the coordinate 705. As an example, hue may be used to represent depth, time or position of the geological object. Other attributes may be chosen for display 707 which include characteristics such as thickness, relative position, porosity, lithological attributes, petrophysical attributes, etc. These characteristics may then be displayed using other color-features 709 chosen from hue, saturation and intensity, or an arbitrarily selected color wheel or color table, and the data displayed 711, so that two, three or more characteristics of geological objects can be displayed together.

Persons skilled in the art will understand that the method and apparatus described herein may be practiced, including but not limited to, the embodiments described. Further, it should be understood that the invention is not to be unduly limited to the foregoing which has been set forth for illustrative purposes. Various modifications and alternatives will be apparent to those skilled in the art without departing from the true scope of the invention, as defined in the following claims. While there have been illustrated and described particular embodiments of the present invention, it will be appreciated that numerous changes and modifications will occur to those skilled in the art, and it is intended in the appended claims to cover those changes and modifications which fall within the true spirit and scope of the present invention.

What is claimed is:

1. A method for displaying a geological feature, the method comprising:
    (a) assigning a coordinate value along a first axis of a three-dimensional coordinate system for the geological feature;
    (b) assigning a first color-feature to said geological feature based on said coordinate value assigned along said first axis;

(c) assigning a second color-feature for values of a first characteristic of said geological feature; and (d) displaying the geological feature using said first color feature and the second color feature.

2. The method of claim 1 further comprising assigning a third color feature for values a second characteristic of said geological feature.

3. The method of claim 1 wherein said first color-feature is hue.

4. The method of claim 1 wherein said second color-feature is intensity.

5. The method of claim 2 wherein said third color-feature is saturation.

6. The method of claim 1 wherein said first axis is the vertical axis.

7. The method of claim 1 wherein said coordinate value is the nearest point to an origin along said first axis.

8. The method of claim 1 wherein any color feature is mapped from a color table.

9. The method of claim 1 further comprising selecting at least one characteristic of the geological feature from a list comprising: i) coordinate values, ii) thickness values; iii) distance values from a selected reference coordinate position, iv) petrophysical values, v) time values, vi) depth values, vii) seismic travel time values, viii) source to receiver offset values, ix) amplitude values, and x) velocity values, xi) similarity values.

10. The method of claim 1 further comprising displaying geological features chosen from a list comprising: i) bedding, ii) faults, iii) horizons, iv) reservoirs, v) channels, vi) lineaments, vii) mountains, viii) valleys, ix) mesas, and x) islands.

11. A method for displaying selected characteristics of a geological feature, the method comprising:

(a) assigning a color hue to the geological feature based on a coordinate value of a first axis of a 3-D coordinate system;

(b) assigning a color intensity to represent values of a first selected characteristic of the geological feature;

(c) assigning a color saturation to represent values of a second selected characteristic of the geological feature; and (d) displaying said geological feature using said hue intensity and saturation.

12. The method of claim 11 further comprising selecting at least one characteristic of the geological feature from a list comprising: i) coordinate values, ii) object thickness values; iii) distance values from a selected reference coordinate position, iv) petrophysical values, v) time values, vi) depth values, vii) seismic travel time values, viii) source to receiver offset values, ix) amplitude values, and x) velocity values, xi) similarity values.

13. The method of claim 1 further comprising displaying geological features chosen from a list comprising: i) bedding, ii) faults, iii) horizons, iv) reservoirs, v) channels, vi) lineaments, vii) mountains, viii) valleys, ix) mesas, and x) islands.

14. The method of claim 1 wherein any color feature is mapped from a color table.

15. In a computer programmed to produce images representative of a geological feature, an article of manufacture comprising: a medium that is readable by a computer and that carries instructions for said computer to perform a process comprising:

(a) assigning a coordinate value along a first axis of a three-dimensional coordinate system for the geological feature;

(b) assigning a first color-feature to said geological feature based on said coordinate value assigned along said first axis;

(c) assigning a second color feature for values of a first characteristic of said geological feature; and (d) displaying the geological feature using said first color feature and the second color feature.

16. The article of manufacture of claim 15 further comprising assigning a third color feature for values a second characteristic of said geological feature.

17. The article of manufacture of claim 15 wherein said first color-feature is hue.

18. The article of manufacture of claim 15 wherein said second color-feature is intensity.

19. The article of manufacture of claim 16 wherein said third color-feature is saturation.

20. The method of claim 15 wherein said coordinate value is the nearest point to an origin along said first axis.

21. The article of manufacture of claim 15 wherein said geological feature characteristics are selected from a list comprising: i) coordinate values, ii) object thickness values; iii) distances from selected reference coordinate values, iv) petrophysical values, v) time values, vi) depth values, vii) seismic travel time values, viii) source to receiver offset values, ix) amplitude values, x) velocity values, and xi) similarity values.

22. A device adapted for use by a workstation wherein geological data is read into memory and processed into a color display of a subterranean feature, comprising: computer readable means carrying instructions for a process comprising:

(a) assigning a coordinate value along a first axis of a three-dimensional coordinate system for the subterranean feature;

(b) assigning a first color-feature to said subterranean feature based on said coordinate value assigned along said first axis;

(c) assigning a second color feature for values of a first characteristic of said subterranean feature; and (d) displaying the subterranean feature using said first color feature and the second color feature.

23. The device adapted for use by a workstation of claim 22 further comprising assigning a third color feature for values a second characteristic of said geological feature.

24. The device adapted for use by a workstation of claim 22 wherein the first color-feature is hue.

25. The device adapted for use by a workstation of claim 22 wherein said second color-feature is intensity.

26. The device adapted for use by a workstation of claim 23 wherein said third color-feature is saturation.

27. The device adapted for use by a workstation of claim 23 wherein any color feature is mapped from a color table.

28. The device adapted for use by a workstation of claim 22 further comprising selecting said subterranean feature characteristic attribute values from a list comprising: i) coordinate values, ii) object thickness values; iii) distance values from selected reference coordinate, iv) petrophysical values, v) time values, vi) depth values, vii) seismic travel time values, viii) source to receiver offset values, ix) amplitude values, x) velocity values, and xi) similarity values.

29. The device adapted for use by a workstation of claim 22 wherein geological features are chosen from a list comprising: i) bedding, ii) faults, iii) horizons, iv) reservoirs, v) channels, vi) lineaments, vii) mountains, viii) valleys, ix) mesas, and x) islands.

* * * * *